United States Patent [19]

Willis et al.

[11] Patent Number: 4,960,831

[45] Date of Patent: Oct. 2, 1990

[54] BLOCK COPOLYMER GRAFTING PROCESS

[75] Inventors: Carl L. Willis; Michael F. Conway, both of Houston, Tex.; Michael K. Martin, Woodbury, Minn.

[73] Assignee: Shell Oil Company, Houston, Tex.

[21] Appl. No.: 398,298

[22] Filed: Aug. 24, 1989

Related U.S. Application Data

[62] Division of Ser. No. 225,995, Jul. 29, 1988, abandoned, which is a division of Ser. No. 946,269, Dec. 24, 1986, abandoned.

[51] Int. Cl.$^5$ .......................... C08F 8/10; C08C 19/28
[52] U.S. Cl. ......................................... 525/250; 525/92; 525/171; 525/242; 525/314; 525/316
[58] Field of Search ............... 525/314, 242, 250, 314, 525/316, 383

[56] References Cited

U.S. PATENT DOCUMENTS

| | | | |
|---|---|---|---|
| 3,005,807 | 10/1961 | Schutze | 525/383 |
| 3,448,176 | 6/1969 | Balas | 525/314 |
| 3,632,681 | 1/1972 | Pope | 525/314 |
| 3,912,793 | 10/1975 | Horiie | 525/314 |
| 4,068,050 | 1/1978 | Danzig | 526/21 |
| 4,687,815 | 8/1987 | Wong | 525/271 |

*Primary Examiner*—Patricia Short

[57] ABSTRACT

Elastomeric polymers comprising at least one alkali metal atom are modified by incorporating at least one group capable of sterically hindering coupling reactions which frequently occur when functional groups are subsequently incorporated into such polymers. In general, the group capable of sterically hindering coupling reactions may be incorporated by reacting the elastomeric polymer comprising at least one alkali metal atom with a compound containing a group capable of reacting with the elastomeric polymer at one end and at least one pendant group larger than hydrogen at the other. Groups that will react with elastomeric polymers comprising at least one alkali-metal atom are of course, well known, in the art, and include groups containing sulfur, oxygen, nitrogen and the like and ethylenically and acetylenically unsaturated groups. Compounds containing terminal ethylenically unsaturated groups are particularly useful in preparing the modified elastomeric polymers of this invention. Terminal groups capable of sterically hindering coupling reactions, generally, include all groups larger than hydrogen. Hydrocarbon groups are, however, particularly useful since these generally do not alter the properties which are characteristic of the elastomeric polymers. Aromatic groups containing at least 6 carbon atoms or cyclic hydrocarbon groups containing at least 5 carbon atoms are particularly effective. 1,1-diphenyl ethylene is particularly preferred in the present invention. Elastomeric polymers which have been modified in accordance with this invention may then be functionalized with less risk of undesirable coupling.

4 Claims, No Drawings

BLOCK COPOLYMER GRAFTING PROCESS

This is a division of application Ser. No. 255,995, filed July 29, 1988, now abandoned, which is a division of application Ser. No. 946,269, filed Dec. 24, 1986, now abandoned.

BACKGROUND OF THE INVENTION

This invention relates to a novel polymer, to functionalized derivatives of said novel polymer, to processes for preparing said novel polymer and said derivatives and to compositions comprising said derivatives. More particularly, this invention relates to a modified elastomeric polymer, to functionalized derivates of said polymer, to processes for preparing said modified polymer and said functionalized derivatives and to compositions comprising said derivatives.

Elastomeric homopolymers and copolymers of various hydrocarbon monomers are, of course, well known in the prior art. For example, diolefin homopolymers are known to exhibit rubber-like characteristics while diolefin copolymers, particularly those comprising vinyl aromatic compounds, exhibit diversified characteristics ranging from rubber-like characteristics to resin-like characteristics, depending primarily upon the amount of diolefin branching, the amount of internal unsaturation incorporated by the diolefin and the content of the vinyl aromatic monomer in the copolymer. It is also known in the prior art to use polymers of this type and functionalized derivates thereof in various applications such as the molding of shoe soles and the like, as impact modifiers for various thermosetting resins, as adhesives, as sealants, in coating formulations, as binders and the like. As is also well known in the prior art, diolefin homopolymers and copolymers may be modified by incorporating one or more functional groups into the polymer, which functional groups will improve polymer properties for use in a variety of known areas of application. For example, it is known that: the incorporation of one or more mono- or polycarboxyl groups will improve the polymers adhesive properties, green strength and other properties; the incorporation of a silanol group will improve strength and friction properties; the incorporation of an ester group will improve the properties required in thermoset molding applications and the incorporation of phosphoric ester groups will improve the polymer's flame retarding characteristics.

Heretofore, several methods have been proposed for modifying various diolefin polymers to incorporate at least one functional group such as the functional groups disclosed in U.S. Pat. Nos. 3,135,716 and 4,409,357. These methods include the grafting of a dicarboxylic acid group or a derivative thereof onto a base polymer such as is taught in U.S. Pat. No. 4,329,430 and the grafting of mono- and polycarboxylic acid groups onto such a polymer as is taught in U.S. Pat. No. 4,579,429. These methods also include reaction of a functionalizing agent with a diolefin homopolymer or copolymer comprising at least one active group containing an alkali metal atom, particularly a lithium atom, as is taught in U.S. Pat. Nos. 3,135,716; 3,225,089; 3,242,129; 3,892,819 and 4,400,478. As is known in the prior art, these methods have led to the production of modified diolefin homopolymers and copolymers having improved properties for various applications. With the grafting methods, however, it is difficult to control the number of functional groups, such as carboxyl groups, actually incorporated into the polymer and, frequently, more carboxyl groups are incorporated than are necessary for the improvements sought. This, in turn, significantly increases the cost of the modified diolefin homopolymer or copolymer. Those methods wherein a functional group, such as carbon dioxide, is incorporated by reaction of a functionalizing agent with one or more active sites containing an alkali metal atom do not, on the other hand, suffer from these same disadvantages, however, it is, at best, difficult to control the number of functional groups, such as carboxyl groups, actually introduced into the polymer primarily because of the coupling reactions which frequently occur between the lithium salt groups formed as a result of the treatment with the functionalizing agent and the active sites themselves. In this regard, it is believed well known that a so called living polymer comprising at least one active site containing a lithium atom will react spontaneously with carbon dioxide to produce the lithium salt of an acid. The reaction may be represented as follows:

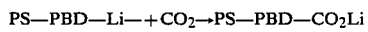

wherein PS—PBD is a block copolymer comprising a single block of polystyrene (PS) and a single block of polybutadiene (PBD). The lithium salt thus produced will then react with the living polymer. This reaction may be represented as follows:

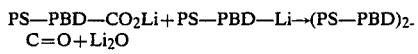

(PS—PBD—)$_2$C=O is then a dicoupled polymer. This dicoupled polymer will also react with a living polymer to produce a tricoupled polymer. This reaction may be represented as follows:

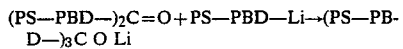

As is also well known, the dimer and trimer formed by the coupling reactions do not exhibit improved properties for various applications in which diolefin homopolymers and copolymers are normally used. For example, neither the dimer nor trimer contain the desired functional group, at least, not in an active form. Moreover, since the molecular weight is either doubled or tripled, the dimer and trimer are inferior to the base polymer without a functional group for use in most applications. In this regard, it should be noted that coupling significantly increases solution viscosity and when the polymer is to be used as a solution the higher viscosity will reduce, if not eliminate, the range of equipment that might otherwise be used for such applications. It will, of course, be appreciated that similiar reactions could be illustrated for other functionalizing reagents as shown in the aforementioned U.S. Patents and similar adverse effects would be realized.

In processes proposed heretofore for carboxylating diolefin homopolymers and copolymers, the yield of uncoupled polymer containing carboxyl functionality has, generally, been less than 10 wt% of the total product. Moreover, the use of coupling inhibitors such as methanol has not significantly changed the yield of uncoupled polymer containing carboxyl functionality even though these inhibitors do significantly reduce the amount of coupled product actually obtained. In light of this, then, the need for an improved process for functionalizing diene homopolymers and copolymers, which process will permit control of the amount of functionality actually incorporated into the polymer and prevent, or at least permit control of, coupling is believed to be readily apparent. In addition, the need for an improved polymer containing various functionality is also believed to be readily apparent.

SUMMARY OF THE INVENTION

It has now been discovered that the foregoing and other disadvantages of the prior art elastomeric polymers can be overcome or at least significantly reduced with the elastomeric polymer of the present invention. It is, therefore, an object of the present invention to provide an improved elastomeric polymer, functionalized derivation thereof, and processes for making said improved elastomeric polymer and functionalized derivations thereof. It is another object of this invention to provide such functionalized derivatives containing less, or at least a controlled amount of, coupled segments. It is still another object of this invention to provide such functionalized derivatives containing more, or at least a controlled amount of, functional groups. It is yet another object of this invention to provide such functionalized derivatives having improved properties. The foregoing and other objects and advantages will become apparent from the description set forth hereinafter.

In accordance with the present invention, the foregoing and other objects and advantages are accomplished by first reacting an elastomeric polymer comprising at least one active group containing an alkali metal atom, particularly a lithium atom, with a compound containing at least one pendant group capable of sterically hindering a coupling reaction and at the same time retaining the alkali metal atom in the structure and available for subsequent reaction, or otherwise incorporating such a group capable of sterically hindering a coupling reaction and thereafter reacting the elastomeric polymer comprising said compound containing at least one pendant group capable of sterically hindering a coupling reaction with a reagent which will incorporate the desired functional group. In general, any compound containing a terminal pendant group larger than hydrogen at one end and a group at the opposite end of said compound capable of reacting with an alkali metal alkyl compound may be used to impart the desired steric hindrance capability and first reacted with or otherwise incorporated into a living elastomeric polymer. For convenience, the compound used to impart the requisite steric hindrance into the elastomeric polymer will, frequently, herein be referred to as a steric hindering compound and the group incorporated in the elastomer will, frequently, be referred to as a steric hindering group. As indicated more fully hereinafter, the effectiveness of the hindering compound increases as the size of the hindering group increases, at least, until the size of the group is at least equal to the size of a six member cyclic radical. Moreover, and as indicated more fully hereinafter, the effectiveness of the steric hindering compound further increases if the terminal carbon atom thereof contains two pendant groups larger than hydrogen and the effectiveness still further increases as the size of the second pendant group increases, at least, until it too is at least equal to the size of a six member ring radical.

DETAILED DESCRIPTION OF THE INVENTION

As indicated supra, the present invention relates to elastomeric polymers, which have been modified to incorporate a steric hindering group or compound which will prevent coupling reactions between functional groups added either simultaneously with the steric hindering compound or subsequent thereto. In general, any of the elastomeric homopolymers and copolymers known in the prior art may be chemically treated to incorporate a steric hindering compound in accordance with the present invention. The method of the present invention, is, however particularly effective with homopolymers and copolymers which are prepared via anionic polymerization with an organo metallic catalyst, wherein said metal is an alkali metal, particularly lithium, since the terminal active groups comprising the alkali metal atom may be readily treated to incorporate the steric hindering compound. Elastomeric homopolymers and copolymers prepared via other techniques may, however, be metallated so as to comprise at least one terminal active site containing an alkali metal atom, particularly a lithium atom, using methods well known in the prior art, and then treated to incorporate a steric hindering group in accordance with the present invention. As also indicated supra, any compound containing at one end a group which will react with an alkyl lithium compound and at least one pendant group at the other end thereof sufficiently large as to hinder reaction with functional groups incorporated into the polymer simultaneously or subsequently may be used as a steric hindering compound.

As indicated supra, any elastomeric polymer known in the prior art may be chemically treated to incorporate a steric hindering compound in accordance with this invention. Useful elastomeric polymers, then, include those prepared in bulk, suspension, solution or emulsion. As is well known, polymerization of monomers to produce an elastomer may be accomplished using free-radical, cationic and ionic initiators or polymerization catalyst. As indicated more fully hereinafter, however, it is important to the present invention that the elastomeric polymer comprise at least one active group containing an alkali metal atom when it is treated to incoporate the conjugated diolefin linkage. As a result elastomeric polymers prepared with free-radical or cationic initiators as well as those produced with an anionic initiator and then treated to deactivate the active site must be metallated to incorporate at least one such active site prior to treatment to incorporate the steric hindering group by the method of this invention. Metalization may, of course, be accomplished using techniques well known in the prior art. Notwithstanding that any elastomeric polymer may be used in the present invention, elastomers prepared with an anionic initiator and then treated to incorporate a conjugated diolefin linkage before deactivation of the active site are preferred in the present invention and the invention will be described in greater detail by reference to such polymers. Any metallated polymer containing at least one alkali-metal atom may, however, be substituted for such active, living polymers.

Living elastomeric homopolymers and copolymers comprising at least one terminal active group containing an alkali metal ion, which polymers are particularly useful in the present invention, may be prepared in accordance with techniques well known in the prior art.

In general, such polymers are prepared by contacting the monomer or monomers to be polymerized with an organo alkali metal compound in a suitable solvent at a temperature within the range from about $-150°$ C. to about $300°$ C. Particularly effective polymerization initiators are organo lithium compounds having the general formula $RLi_n$ wherein R is an aliphatic, cycloaliphatic or aromatic hydrocarbon radical having from 1 to 20 carbon atoms and n is an integer of 1 to 4. In general, the elastomeric polymers useful in the present invention will have a molecular weight within the range of from about 2,000 to about 200,000 and when the elastomeric polymer is a copolymer of 1 or more diolefins and 1 or more other monomers, the polymer will comprise from about 20 to about 99 wt% monomeric diolefin units. In general, the diolefin polymers useful in this invention may be polymers of one or more diolefins, particularly conjugated diolefins, containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like, preferably those containing 4 to 8 carbon atoms. Moreover, one or more of the hydrogen atoms in these diolefins may be substituted with halogen. The diolefin polymer may also be a copolymer of one or more of the aforementioned diolefins and one or more other monomers. Other monomers which may be used include vinylaryl compounds such as styrene, various alkyl styrenes, paramethoxystyrene, vinylnaphthalene, vinyltoluene and the like, heterocyclic nitrogen-containing monomers such as pyridine and quinoline derivatives containing at least one vinyl or α-methyl vinyl group such as 2-vinylpyridine, 3-vinylpyridine, 4-vinylpyridine and the like. Still other useful monomers include acrylic and methylacrylic acid esters, vinyl halides, vinylidine halides, various vinyl esters and the like.

The diolefin homopolymers and copolymers useful in the present invention include those terminally reactive homopolymers and copolymers described in U.S. Pat. Nos. 3,135,716; 3,150,209; 3,496,154; 3,498,960; 4,145,298 and 4,238,202, the disclosure of which patents are herein incorporated by reference. Those diolefin homopolymers and copolymers having only one terminal lithium atom, and described in U.S. Pat. Nos. 3,150,209; 3,496,154; 3,498,960; 4,145,298 and 4,238,202, are particularly useful in the present invention. Diolefin copolymers useful in the present invention also include the block copolymer prepared in accordance with the methods described in U.S. Pat. Nos. 3,231,635; 3,265,765 and 3,322,856, the disclosure of which patents are incorporated herein by reference. Particularly useful block copolymers are those block copolymers having the general formulae $B_x[A-B]_y$ and $A_x-[B-A]_y$ wherein A and B are as defined in the aforementioned U.S. Pat. Nos. 3,231,635; 3,265,765; and 3,322,856, x is a number equal to 0 or 1 and y is a whole number from 1 to about 15.

As indicated supra, the elastomeric homopolymer or copolymer treated by the method of this invention must comprise at least one active site containing an alkali metal atom, preferably a lithium atom. As also indicated supra, in the event that the elastomeric homopolymer or copolymer to be treated in the present invention does not contain such an active group, the polymer may first be treated to incorporate such a group.

In general, metalation may be carried out by means of a complex formed by the combination of a lithium component which can be represented by $R'(Li)_x$ with a polar metalation promoter. The polar compound and the lithium component can be added separately or can be premixed or pre-reacted to form an adduct prior to addition to the solution of the hydrogenated copolymer. In the compounds represented by $R'(Li)_x$, the R' is usually a saturated hydrocarbon radical of any length whatsoever, but ordinarily containing up to 20 carbon atoms, and can be an aromatic radical such as phenyl, napthyl, tolyl, 2-methylnaphthyl, etc., or a saturated cyclic hydrocarbon radical of e.g. 5 to 7 carbon atoms, a mono-unsaturated cyclic hydrocarbon radical of 5 to 7 carbon atoms, an unconjugated, unsaturated aliphatic hydrocarbon radical of 1 to 20 carbon atoms, or an alkyllithium having one or more aromatic groups on the alkyl group, the alkyl group containing 1 to 20 carbon atoms. In the formula $R'(Li)_x$, x is an integer of 1 to 3. Representative species include, for example: methyllithium, isopropyllithium, sec-butyllithium, n-butyllithium, t-butyllithium, n-dodecyllithium, 1,4-dilithiobutane, 1,3,5-trilithiopentane, and the like. The lithium alkyls must be more basic than the product metalated alkyl. Of course, other alkali metal or alkaline earth metal alkyls may also be used; however, the lithium alkyls are presently preferred due to their ready commercial availability. In a similar way, metal hydrides may also be employed as the metalation reagent but the hydrides have only limited solubility in the appropriate solvents. Therefore, the metal alkyls are preferred for their greater solubility which makes them easier to process.

In general, lithium compounds alone metalate copolymers containing aromatic and olefinic functional groups with some difficulty and high temperatures which may tend to degrade the copolymer are frequently required. However, in the presence of tertiary diamines, bridgehead monoamines and certain metal alkoxides, metalation proceeds rapidly and smoothly at acceptable temperatures; e.g. $-70°$ C. to about $150°$ C. Moreover, some lithium compounds may be used alone, effectively, particularly the methyllithium alkyls.

Since, the polymers to be modified in accordance with the present invention must comprise at least one active group containing an alkali metal atom, preferably a lithium atom, elastomeric polymers prepared via anionic polymerization with an organo metal compound, wherein said metal is an alkali metal, will be particularly useful in the present invention particularly when used prior to deactivation of the group or groups containing an alkali metal. To the extent that the active group has, however, been previously neutralized or deactivated, the polymer may be metallated so as to incorporate at least one active group.

In the next step of the modification, a polymer comprising at least one active group containing an alkali metal atom, preferably a lithium atom, will be reacted with a steric hindering compound. As indicated supra, the steric hindering compound will contain a group capable of reacting with the polymeric active group through the alkali metal atom at one end and at least one pendant group capable of hindering reaction between functional groups at the other end. Groups that will react with the polymeric active group through the alkali metal atom include, but are not necessarily limited to, groups containing sulfur, oxygen, nitrogen and the like and ethylenically and acetylenically unsaturated groups. Ethylenically unsaturated groups are preferred, particularly terminal ethylenically unsaturated group.

Groups which will sterically hinder reaction between functional groups include, but are not necessarily limited to, alkyl, cyclic, alicyclic, aryl and aliaryl hydrocarbon radicals. One or more of the hydrogen atoms in said hydrocarbon radical may, of course, be substituted with a halogen atom. Particularly useful steric hindering compounds are those compounds comprising an ethylenically unsaturated group at one end and at least one pendant cyclic group, most preferably two pendant cyclic groups, at the other end. The cyclic group may be completely saturated, partially saturated or aromatic. Particularly useful and, hence, preferred steric hindering compounds include 1- and 1,1-substituted ethylenes, wherein both the 1 and 1,1-substituents are cyclic.

In general, reaction between the steric hindering compound and the active or living polymer will be accomplished in a suitable solvent at a temperature within the range from about 0° C. to about 200° C. Nominal holding times at reaction conditions will, generally, range from about 1 to about 120 minutes. Suitable solvents include any of the solvents known in the prior art to be effective for use during preparation of the elastomeric homopolymer or copolymer. These include hydrocarbons such as paraffins, cycloparaffins, aromatics and alkyl-substituted aromatics containing from about 4 to about 10 carbon atoms per molecule. Suitable solvents include benzene, toluene, cyclohexane, methylcyclohexane, n-butane, n-hexane, n-heptane and the like. Incorporation of an unsaturated steric hindering group could, of course, be accomplished by adding the steric hindering compound during the polymerization reaction, particularly at or near the completion thereof. Moreover, if the steric hindering compound is, itself, a monomer which polymerizes significantly slower than the monomer or monomers being polymerized, such as styrene, u-methylsyrene and the like when the monomer being polymerized is a diolefin, the monomeric steric hindering compound may be added at an earlier stage of the polymerization.

In general, reaction between the living polymer and the steric hindering compound proceeds stoichiometrically. It will, then, generally be sufficent to combine one mole of steric hindering compound per mole of active site containing an alkali metal atom to be converted. To insure complete conversion, however, a slight excess of steric hindering compound over the stoichiometric amount may conveniently be used.

As suggested supra, a controlled amount of coupling may in some cases be desirable and such control is possible in the method of this invention. When coupling is desired, then, stoichiometric conversion of the active sites in the living polymer will not be accomplished. In this regard, it should be noted that the amount of coupling could be reduced by about half of that which would occur without end-capping if only 50% of the polymer active sites are first end-capped with a steric hindering compound. Similarly, the amount of coupling could be reduced about 25% by end-capping only 25% of the active sites and the amount of coupling could be reduced by about 75% by end-capping only 75% of the active sites.

After the desired number of active sites in the polymer have been reacted with a steric hindering compound and thus end-capped, the polymer, which will still contain active sites having alkali metal atoms therein may then be reacted with the desired functionalizing agent. In general, any of the functionalizing agents known in the prior art may be used. Suitable functionalizing agents include those disclosed in U.S. Pat. Nos. 3,135,716 and 4,409,357, the disclosure of which patents are herein incorporated by reference. For the reasons heretofore indicated, if all of the active groups containing an alkali metal atom of the polymer are end-capped either by subsequent reaction with a steric hindering compound or by incorporation of such a compound into the polymerization reaction, the functionalization may be accomplished with a significant reduction in the amount of coupling that occurs. Moreover, if the steric hindering compound contains two hindering groups of sufficient size to prevent coupling the functionalization may be accomplished without any significant coupling through the functional groups.

In general, reaction of the stoichiometrically end-capped or partially end-capped living polymer with the functionalization group will be accomplished at a temperature within the range from about 0 to about 200° C. Generally, nominal holding times within the range from about 1 to about 120 minutes will be sufficient to permit complete reaction of the functionalizing compounds with the living polymer. If the living polymer has been stoichiometrically end-capped with a steric hindering compound containing two steric hindering groups both of which are sufficiently large to prevent coupling, the reaction between the functional group and the living polymer will occur stoichiometrically. In all other cases, however, some coupling will occur and the number of functional groups functionally incorporated into the polymer will be less than 1:1 based on active groups containing an alkali metal atom initially contained in the living polymer.

In general, the modified elastomer polymer of this invention may be used in any of the applications known in the prior art. In general, the actual application will depend in large part upon the selection of functional groups incorporated into the polymer after the end-capping has been accomplished. For example, if the incorporated functional group comprises silicon, the polymer would be particularly useful in the preparation of footwear. If the functional group incorporated contains an ester group, the product would be particularly useful as a modifier in a thermosetting polyester resin. Similarly, if the functional group incorporated is carboxyl, the product will exhibit improved adhesive properties and may be used as a modifier for thermosetting esters or in various coating compositions. Moreover, the end-capped polymer may be used without the addition of a functional group as an elastomer in many applications and as a thermoplastic resin in various molding operations. The end use will also depend upon relative monomer composition if the elastomeric polymer is a copolymer and upon the polymer molecular weight.

PREFERRED EMBODIMENT OF THE INVENTION

In a preferred embodiment of the present invention, a diolefin block copolymer will be end-capped with a steric hindering compound containing two hindering groups sufficiently large to prevent at least about 50 to about 100% of the coupling reactions between functionalizing groups that would otherwise occur without the end-capping. In the preferred embodiment, the hindering groups will be cyclic and polycyclic hydrocarbon radicals containing from 5 to 18 carbon atoms. In a most preferred embodiment of the present invention, 1,1-diphenylethylene will be used as the steric hindering compound. The block copolymer used in the preferred embodiment will be prepared using the method described in U.S. Pat. No. 3,231,635 and will comprise a single alkenyl-substituted aromatic hydrocarbon block and a single diolefin block. The block copolymer may be represented by the general formula A-B wherein A and B are, respectively, polymer blocks of an alkenyl-substituted aromatic hydrocarbon and a diolefin. In the preferred embodiment, the alkenyl-substituted aromatic hydrocarbon block will have a weight average molecular weight within the range of from about 2,000 to about 35,000 and the diolefin block will have a weight average molecular weight within the range from about 5,000 to about 150,000. In a most preferred embodiment, the alkenyl-substituted aromatic hydrocarbon will be styrene and the diolefin will be a conjugated diolefin, most preferably, either butadiene or isoprene.

In the preferred embodiment, the block copolymer will be end-capped in accordance with this invention after the block copolymer has been prepared but before the active site formed during polymerization has been converted or deactivated. In the preferred embodiment, the block copolymer will contain, on average, approximately one active site containing a lithium atom per polymer segment. In the preferred embodiment, the thus living polymer will be reacted with a steric hindering compound containing two hindering groups sufficiently large to prevent any significatn coupling by reaction of functional groups subsequently added.

In the preferred embodiment, end-capping of the living polymer will be accomplished in the same solvent as was used for polymerization. Reaction between the living polymer and the steric hindering compound comprising two terminal hindering groups which are sufficiently large to prevent at least 50% of the coupling which might otherwise occur will be accomplished at a temperature within the range from about 25° C. to about 100° C. and with a nominal holding time within the range from about 1 to about 120 minutes. The thus end-capped polymer may then be reacted with any of the functionalizing compounds theretofore known in the prior art. In a most preferred embodiment, the end-capped polymer will be reacted with carbon dioxide and then an acid so as to incorporate a terminal carboxyl group. Reaction with carbon dioxide will be accomplished at a temperature within the range from about 25° C. to about 100° C. Reaction with carbon dioxide may be accomplished by adding a solvent saturated with carbon dioxide to the end-capped product or by bubbling gaseous carbon dioxide through a solution of the end-capped product. In general, any carbon dioxide partial pressure would be effective but partial pressures within the range from about 1 to about 300 psig are adequate and hence, preferred.

As is well known in the prior art, reaction of the end-capped polymer, which as indicated supra, will still contain an active alkali metal atom, forms an alkali metal salt. As is also well known in the prior art, the alkali metal salt may be converted to the acid simply by treatment of the salt with an acid. In general, any of the acids known in the prior art to be effective for this purpose may be used. Monocarboxylic acids are, however, preferred. In general, reaction of the acid with the alkali metal salt will be accomplished at a temperature within the range from about 0° C. to about 100° C. with a nominal holding time within the range from about 1 to about 120 minutes. In a preferred embodiment, reaction of the acid with the lithium salt will be accomplished at a temperature within the range of from about 25° C. to about 80° C. and at nominal holding times within the range from about 1 to about 10 minutes.

The carboxyl terminated elastomeric block copolymer prepared in accordance with a preferred embodiment of the present invention is particularly useful in those applications where improved adhesion is desired and as a modifier in thermosetting unsaturated polyester resin compositions. Moreover, since the product contains a minimal amount of coupled polymer segments, it may be physically incorporated into such compositions via physical mixture therein with a reduced threat of destructive phase separation which has, heretofore, frequently occurred when elastomeric diene homopolymers or copolymers have been physically incorporated into such compositions.

Having thus broadly described the present invention and a preferred and most preferred embodiment thereof, it is believed that the same will become even more apparent by reference to the following examples. It will be appreciated, however, that the examples are presented solely for purposes of illustration and should not be construed as limiting the invention.

EXAMPLE 1

In this example, a styrene-butadiene block copolymer was prepared and then end-capped using 1,1-diphenylethylene. Anionic polymerization of styrene monomer in cyclohexane was initiated using s-butyl lithium as the initiator. Polymerization at 60° C. proceeded to substantial completion affording a living styrene block with a number average molecular weight of 12,000. Polymerization grade butadiene was then added to form the second block of the copolymer. When polymerization of the butadiene was substantially complete, an aliquot of the living polymer cement was analyzed and a number average molecular weight of 70,000 was determined for the diblock copolymer. The living polymer cement solution was then maintained at this same temperature and 1.1 moles of 1,1-diphenylethylene per mole of butyl lithium initially present was added to the solution. The color of the cement intensified as the diphenylethylene reacted and after one hour at 55° C. the solution had reached a maximum in color intensity as measured by colorimeter. The mixture was allowed to stand for an additional one hour.

EXAMPLE 2

In this example, the end-capped block copolymer solution of Example 1 was divided into two equal parts. A first part was then contacted with an excess of $CO_2$ gas (2.5 moles $CO_2$ per mole of butyl lithium initiator). The solution rapidly lost color as the polymer lithium species was carboxylated. After 10 minutes the solution was acidified and the product recovered by coagulation as a white crumb. The product was then analyzed to determine the amount of uncoupled block copolymer contained in the product, the amount of dicoupled block polymer in the product and the amount of tricoupled polymer in the product. The product was also analyzed to determine what percentage of the uncoupled polymer product contained $CO_2$ functionality. As a result of these analysis, it was determined that 81 wt% of the block copolymer was uncoupled and that 87 wt% of the uncoupled product contained $CO_2$ functionality. 12 wt% of the block copolymer product was dicoupled and 7 wt% was tricoupled.

The second part of the product from Example 1 was then added to an equal volume of cyclohexane containing $CO_2$ (pre-dissolved) at a temperature of 25° C. This was an inverse addition technique. The mixture decolorized immediately. After 10 minutes, this product was acidified in the same manner as was the other part and the product then recovered and analyzed in the same manner as was the other part. As a result of these analyses, it was determined that 86 wt% of the product was uncoupled and that 90 wt% of this uncoupled product contained $CO_2$ functionality. 9 wt% of the product was dicoupled and 5 wt% was tricoupled.

EXAMPLE 3

In this example, an end-capped block copolymer of styrene and butadiene was prepared in the same manner as described in Example 1. The product was then contacted with an excess of $CO_2$ gas (2.5 moles of $CO_2$ per mole of butyllithium initiator) which contacting resulted in the rapid loss of color as the polymer lithium species was carboxylated. The resulting product was then analyzed to determine the yield of uncoupled block polymer, the yield of dicoupled block polymer and the yield of tricoupled block polymer. Since the product was not acidified, the product was not analyzed for $CO_2$ functionality. As a result of these analyses, it was determined that 82 wt% of the product was uncoupled, 11 wt% of the product was discoupled and 7 wt% of the product was tricoupled.

EXAMPLE 4

The procedure summarized in Example 3 was repeated except that α-methylstyrene was substituted for the 1,1-diphenylethylene. The functionalized product thus obtained was analyzed to determine the yield of uncoupled polymer and this was determined to be 47 wt% of the product.

EXAMPLE 5

The procedure of Example 3 was again repeated except that styrene was substituted for the 1,1-diphenylethylene and the styrene was used at 5 moles of styrene per mole of butyl lithium rather than the 1.1 moles used in Example 3. The functionalized product actually obtained was analyzed to determine the yield of uncoupled product and this was determined to be 70 wt% of the product.

EXAMPLE 6

In this example, an unend-capped block copolymer of styrene and butadiene was prepared in the same manner as summarized in Example 1. The polymer solution was then contacted with an excess of dry $CO_2$ gas (2.5 moles $CO_2$ per mole of butyl lithium initiator) at a temperature of 60° C. and allowed to stand overnight. The product was then recovered by coagulation from the solvent as a white crumb without an acid treatment to convert the lithium salt. The product was analyzed to determine the yield of uncoupled block copolymer, the yield of dicoupled block copolymer and the yield of tricoupled block copolymer. The yield of unblocked copolymer was determined as 31 wt%, the yield of dicoupled block copolymer was 27 wt% and the yield of tricoupled block copolymer was 42 wt%.

EXAMPLE 7

The procedure of Example 6 was repeated except that a proton source; viz., methanol was added to the solution immediately after the dry $CO_2$ gas was added. Again, the product was recovered without acidification and analyzed to determine the yield of uncoupled, dicoupled and tricoupled product. The yield of uncoupled block copolymer was found to be 54 wt%, the yield of dicoupled block copolymer was 16 wt% and the yield of tricoupled block copolymer was 30 wt%. The product was also analyzed to determine the yield of uncoupled polymer containing $CO_2$ functionality and, as a result, it was learned that only 7 wt% of the uncoupled copolymer contained $CO_2$ functionality.

EXAMPLE 8

In this example, both of the acidified, carboxylated block copolymers of Example 2, the lithium carboxylate functionalized polymer from Example 3 and the lithium carboxylate functionalized polymer from Example 7 were used in a sheet molding compound (SMC) which was prepared according to the following formula:

| Ingredient | Percent |
|---|---|
| Unsaturated Polyester (Propylene Glycol) Maleate Type)[1] | 14.10 |
| Modifier (Carboxylated Block Copolymer)[2] | 14.10 |
| Cure Promoter, PEP-100, Air Products | 0.07 |
| Tertiary-Butyl Perbenzoate | 0.35 |
| Calcium Carbonate (Camel White) | 42.20 |
| Mold Release Agent, Zinc Stearate | 0.90 |
| Black Pigment | 0.07 |
| Glass Fiber, One Inch, Chopped | 28.00 |
| Thickening Agent, Marinco H | 1.10 |

[1] As a 60% w solution in styrene monomer.
[2] As a 30% w solution in styrene monomer.

Parts molded from each of the four SMC's prepared according to the foregoing recipe were judged to be better in surface appearance (glossy, wavyness-free), showed less shrinkage on curing and were tougher than parts from an analogous SMC which did not contain the carboxylated block copolymer modifier. Moreover, the carboxylated polymers prepared in accordance with this invention led to the preparation of stable polyester resin compositions while the polymer of Example 7 which contained only a trace of carboxylate functionality resulted in destructive phase separation when combined with the polyester and other ingredients.

In this regard, it should be noted that in preparing SMC paste, it is desirable to combine the two polymer solutions; viz. the unsaturated polyester and styrene and the modifier in styrene and to utilize this blend as a single liquid component system. In such a blend and when the modifier was the polymer prepared with $CO_2$ dissolved in cyclohexane in Example 2, there was no evidence of phase separation in the blend after a two month period. When the modifier was the polymer of Example 7, however, the two polymers completely separated from solution in less than six hours. As a result, it was necessary to prepare the aformentioned molded article promptly after preparing the SMC formulation containing the polymeric product from Example 7.

Another advantage of the carboxylated polymers prepared in accordance with this invention in sheet molding compounds is the response to thickening agents. This response was determined by first forming a 30 wt% solution of each of the polymers prepared in Example 2 in styrene and thereafter determining the initial viscosity and the viscosity 24 hours after treatment with a thickening agent. The viscosity of the solution containing the polymer prepared with an excess gaseous $CO_2$ was 11,400 CPS initially and 44,600 CPS 24 hours after addition of the thickening agent. This increase in viscosity does, of course, reflect a tremendous response to the thickener; viz., $Mg(OH)_2$. The initial viscosity of the second solution containing the carboxylated polymer prepared with $CO_2$ dissolved in cyclohexane was 9,100 CPS initially and 11,900 CPS 24 hours after addition of the thickening agent. This increase in viscosity again reflects a good response to the thickening agent even though this particular polymer was less responsive than the one prepared with an excess of gaseous $CO_2$.

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

We claim:

1. A method for preparing an elastomeric polymer containing at least one functional group comprising the steps of:
   (a) contacting an elastomeric homopolymer or copolymer molecule comprising one active group containing an alkali metal compound with 1,1-diphenylethylene;
   (b) reacting the product from step (a) with carbon dioxide; and
   (c) recovering an elastomeric polymer molecule containing a carboxyl group.

2. The method of claim 1 wherein step (b) is accomplished at a temperature within the range from about 25° C. to about 100° C.

3. The method of claim 1 wherein the homopolymer or copolymer molecule is a copolymer molecule of at least one diolefin and at least one alkenyl-substituted aromatic compound.

4. The method of claim 3 wherein the copolymer molecule is a block copolymer molecule comprising at least one block of a diolefin and at least one block of an alkenyl-substituted aromatic compound.

* * * * *